(12) United States Patent
Zaffaroni

(10) Patent No.: US 11,597,000 B2
(45) Date of Patent: Mar. 7, 2023

(54) SHEET HANDLING APPARATUS WITH AUTOMATIC REMOVAL OF SEPARATING FOIL AND METHOD THEREOF

(71) Applicant: ASTES4 SA, Balerna (CH)

(72) Inventor: Roberto Zaffaroni, Balerna (CH)

(73) Assignee: ASTES4 SA, Balerna (CH)

( * ) Notice: Subject to any disclaimer, the term of this patent is extended or adjusted under 35 U.S.C. 154(b) by 44 days.

(21) Appl. No.: 17/275,615

(22) PCT Filed: Sep. 11, 2019

(86) PCT No.: PCT/IB2019/057633
§ 371 (c)(1),
(2) Date: Mar. 11, 2021

(87) PCT Pub. No.: WO2020/053769
PCT Pub. Date: Mar. 19, 2020

(65) Prior Publication Data
US 2022/0048092 A1 Feb. 17, 2022

(30) Foreign Application Priority Data
Sep. 12, 2018 (IT) .......... 102018000008519

(51) Int. Cl.
*B21D 43/24* (2006.01)
*B21D 43/28* (2006.01)
(Continued)

(52) U.S. Cl.
CPC ............ *B21D 43/24* (2013.01); *B21D 43/28* (2013.01); *B65G 51/03* (2013.01); *B65G 59/04* (2013.01); *B65G 57/005* (2013.01)

(58) Field of Classification Search
CPC ........ B21D 43/24; B21D 43/28; B21D 33/00; B21D 35/007; B65G 51/03; B65G 59/04; B65G 57/005
See application file for complete search history.

(56) References Cited

U.S. PATENT DOCUMENTS 5,092,578 A * 3/1992 Bergmeier ............... B65H 3/48
271/106
5,234,207 A * 8/1993 Lindstrom ........... B65H 3/0816
271/106
6,345,818 B1 2/2002 Stephan et al.

FOREIGN PATENT DOCUMENTS

DE 33 12 459 10/1984
DE 43 39 839 5/1995
WO 2008/139409 11/2008

OTHER PUBLICATIONS

International Search Report for PCT/IB2019/057633 dated Jan. 1, 2020, 4 pages.
(Continued)

*Primary Examiner* — Lynn E Schwenning
(74) *Attorney, Agent, or Firm* — Nixon & Vanderhye

(57) ABSTRACT

A method and relative sheet handling apparatus apt to pick up sheets from a pack of sheets to be delivered to a cut-ting centre and for removing a separating foil between the sheets is described, including: a lifting and removing unit for a top sheet equipped with upper gripping heads; an air flow generating unit generating an air flow above the pack of sheets; and a control unit of the lifting unit, suitable for arranging the top sheet at a stasis height of up to 70 mm above the pack of sheet to define a suction chamber for the air flow generator.

20 Claims, 4 Drawing Sheets

(51) Int. Cl.
 *B65G 51/03* (2006.01)
 *B65G 59/04* (2006.01)
 *B65G 57/00* (2006.01)

(56) References Cited

OTHER PUBLICATIONS

Written Opinion of the ISA for PCT/IB2019/057633 dated Jan. 1, 2020, 6 pages.

* cited by examiner

SHEET HANDLING APPARATUS WITH AUTOMATIC REMOVAL OF SEPARATING FOIL AND METHOD THEREOF

CROSS-REFERENCE TO RELATED APPLICATIONS

This application is the U.S. national phase of International Application No. PCT/IB2019/057633 filed Sep. 11, 2019 which designated the U.S. and claims priority to IT 102018000008519 filed Sep. 12, 2018, the entire contents of each of which are hereby incorporated by reference.

FIELD OF THE INVENTION

The present invention relates to the SHEET handling field in cutting centres, in particular a metal sheet picking up withdrawing apparatus with automatic removal of the paper foil interposed between the metal sheets, as well as a relative withdrawal method.

TECHNICAL BACKGROUND

As is known, in metal sheet cutting centres—wherein, from a metal plate, single shaped pieces are obtained by means of various cutting devices (laser beam cutting, with oxygen lance, water jet, with plasma and so on)—there is a need to withdraw metal sheets from a warehouse in order to transfer them to the cutting machine.

The metal sheets are typically large rectangular slabs (for example of 1500×3000 mm) of small thickness (for example from 0.5 to 25 mm) which are stacked in individual withdrawing warehouses according to a uniformity criterion, for example the same size and thickness.

In the prior art there are already several apparatuses designed specifically for handling these metal sheets, in particular for withdrawing from the warehouse, loading into the cutting machine and unloading the individual pieces and scraps in a suitably orderly manner. WO2008/139409 discloses one of these particularly effective machines.

It is normal practice to arrange disposable separating foils (typically made of paper) between one sheet and the other of the stack of sheets. The purpose of the foils is to avoid scratches on the surfaces of the sheets (in particular when they are polished stainless sheets) and/or to promote detaching between one plate and another.

With reference to the latter purpose, the presence of the foils avoids "bonding" phenomena between sheets and therefore ensures that, when the metal sheet which is on the top of the pack of the stack is grasped, it will be detached easily and instantaneously from the underlying sheets.

The presence of a paper foil, between one sheet and the other, results in the need to perform removing and parting operation of the sheet itself between successive withdrawing cycles; this operation must intervene immediately after the automatic lifting and transferring system of the sheets towards the cutting centre has withdrawn a first sheet, but in any case before the same system is ready to lift a second sheet. In this regard, it should be noted that the time between the withdrawing of a first sheet and the withdrawing of a second sheet is often of a few tens of seconds.

Removing the paper foil is necessary because its presence would make the gripping handler action of the withdrawing system ineffective.

Currently, this paper foil removing operation is performed by hand. That is, an operator intervenes immediately after a first sheet has been lifted, extends the arm under this lifted sheet and above the stack of other sheets, grabs the paper foil by a corner—or other part that facilitates gripping—and removes quickly the foil of paper, to throw it to the drain. Thus, the inconvenience of this system is immediately apparent, and that is the serious risk to which the operator is subjected, to various types of damage, of which a safety expert can easily become aware.

The attempts to automate this process have proved to be ineffective up to now for various reasons, in particular in view of the width of the paper foil and the fact that the presence of lubricants (for protecting metal sheets) tends to make the foil adhering persistently to the sheet below.

In the sector of plane slab gripping machines, it has already been proposed to use air jets to help separating the sheets of the sheet stack. Some examples are described in DE3312459, DE4339839, U.S. Pat. Nos. 5,234,207, 6,345, 818. These systems, however, are conceived to help detach two sheets from each other, but they are not suitable for dragging a foil away from the top of the stack, because the compressed air blow acts locally and lifts an area around an edge.

SUMMARY

The problem underlying the invention is therefore to propose a device capable of replacing the manual intervention during the operation of removing the paper foil interposed between two sheets.

To this end, it is desired to provide an apparatus capable of effectively, quickly and reliably removing the foil interposed between the sheets, minimizing the impact on the cycle time of the sheet withdrawing operation.

This scope is achieved by means of an apparatus and a method having the essential features mentioned in the main attached claims. The dependent claims describe preferred features of the invention.

BRIEF DESCRIPTION OF THE DRAWINGS

Further features and advantages of the invention will anyhow be more evident from the following detailed description of a preferred embodiment, given by mere way of non-limiting example and illustrated in the attached drawings, wherein.

DETAILED DESCRIPTION OF THE PREFERRED EMBODIMENT

Figure 1:
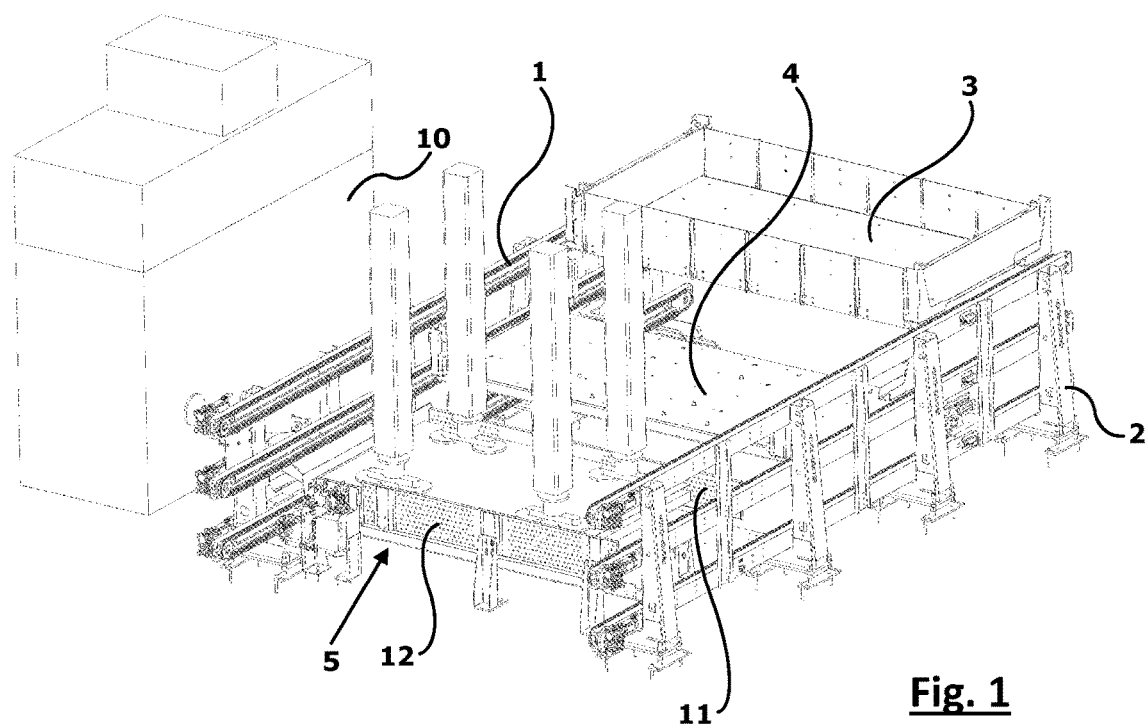
FIG. 1 is a schematic perspective view of an apparatus for withdrawing plates in a cutting centre, equipped with a foil removing system according to the invention.
Figure 2:
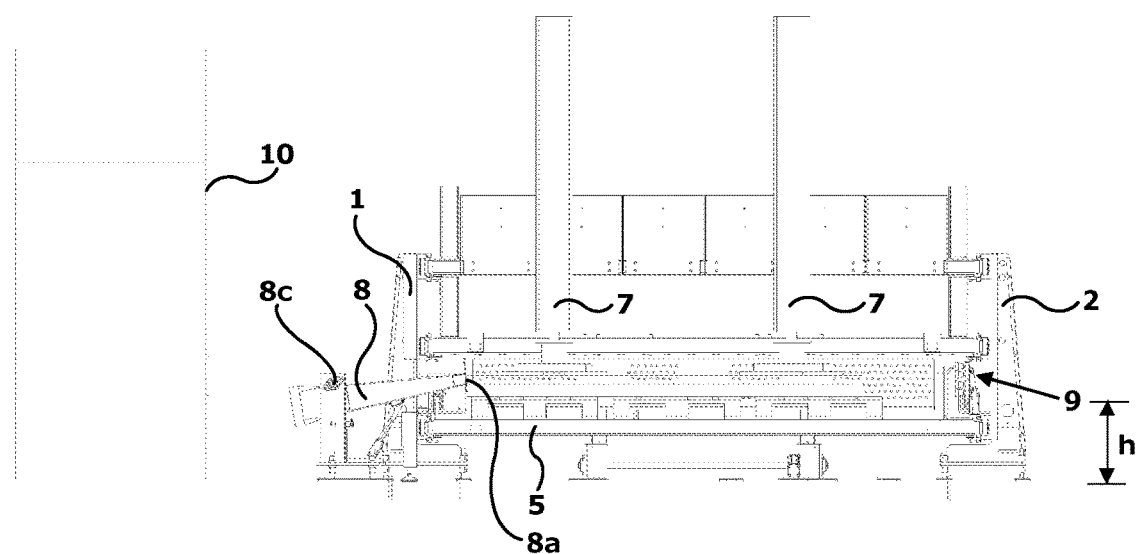
FIG. 2 is an elevational side view, partially cut away, of the apparatus of FIG. 1.

In FIGS. 1 and 2 a complex foil handling system is represented, of which only the part of interest for the purposes of the present invention will be described in detail.

More precisely, in FIG. 1 a transfer storage system is shown, provided with a two flanks frame 1, 2 on which three orders of translatable shelves or drawers 3, 4 and 5 are mounted movably by means of corresponding controlled movement rails 1a and 2a. The lower floor 5 of the storage is intended to house a pack of virgin metal sheets (not shown) waiting for being picket up one by one and transferred to a cutting centre.

Figure 5:
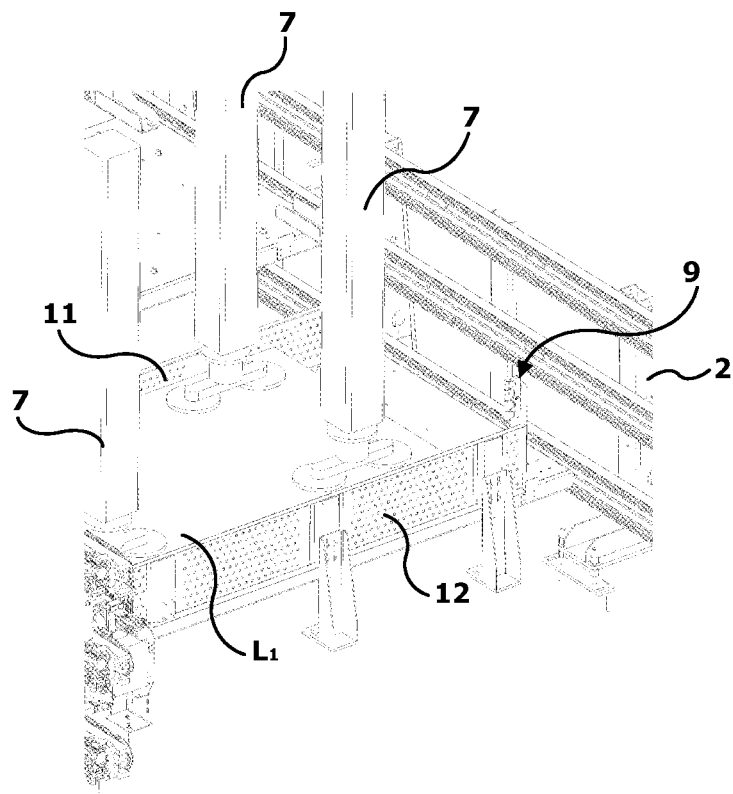
FIG. 5 is an enlarged perspective view of a detail of a blowing assembly located on the right of FIG. 2.

Above the storage, sheet picking-up and transferring means are movably mounted; typically these picking-up means essentially comprise—as illustrated schematically in FIG. 2—a support carriage (not shown) on which gripping heads 7 (better visible in FIG. 5) are mounted, suitable for picking-up the metal sheet at the top of the stack and transferring it to the cutting centre.

Preferably, the configuration of the support carriage and of the gripping heads is as illustrated in detail in document WO2008/139409, the content of which is entirely referred to in the present description, so that it is not considered necessary to add other explanations.

In particular, according to a preferred variant of the picking-up method of the invention, at least two gripping heads 7 are provided spaced along one side, preferably along the major direction of the metal sheet, i.e. in the direction of the width of the storage in the illustrations of FIGS. 1 and 2.

Figure 4:
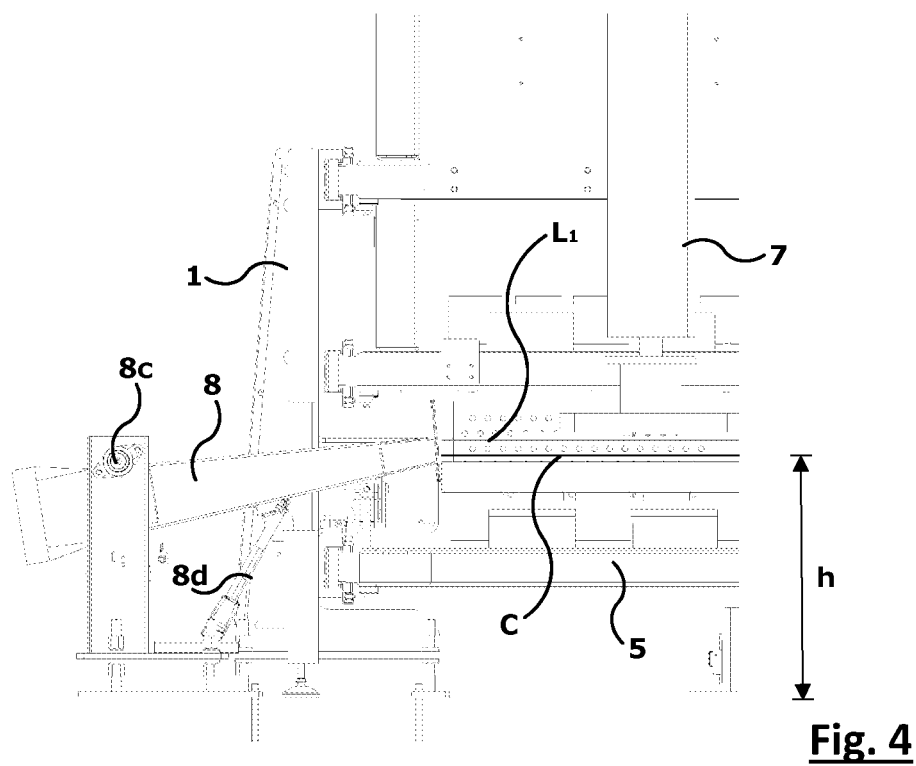
FIG. 4 is an enlarged view of a part of FIG. 2 in an initial phase of the process of removing a paper foil.

According to the invention, close to one of the two sides of the stack of sheets (for example, the smaller side on the left in the drawing of FIG. 2) a convergent suction duct 8 is arranged (see better in FIG. 4), connected to a suction machine 10, for example a machine provided with a volumetric suction impeller.

In particular, the suction convergent duct 8 (FIGS. 2 and 4) has a slightly tapered side profile towards a slot-shaped mouthpiece 8a, facing the storage wherein the stack of sheets is accommodated. In the plan view, the duct 8 has a typically triangular shape with a side coinciding with the mouthpiece 8a and the opposite vertex at the end of the convergent, where it is connected, through a connector 8b, with the suction machine 10.

The slot-shaped mouthpiece 8a has a width of the order of magnitude of one side of the sheets, preferably the smaller side which represents the width of the sheets, and a height of about 60 mm.

According to a preferred embodiment, the convergent duct 8 is mounted so as to be able to lift/lower the level h (FIGS. 2 and 4) of the slot-shaped mouthpiece 8a, so as to adapt the position thereof to the height of the upper sheet arranged at the top of the stack. The height variation can take place by vertically moving the entire convergent duct 8 or by rotating the suction duct around a horizontal articulation hinge 8c, arranged at a suitable distance from the mouthpiece 8a, by means of an actuator 8d.

Figure 2A:
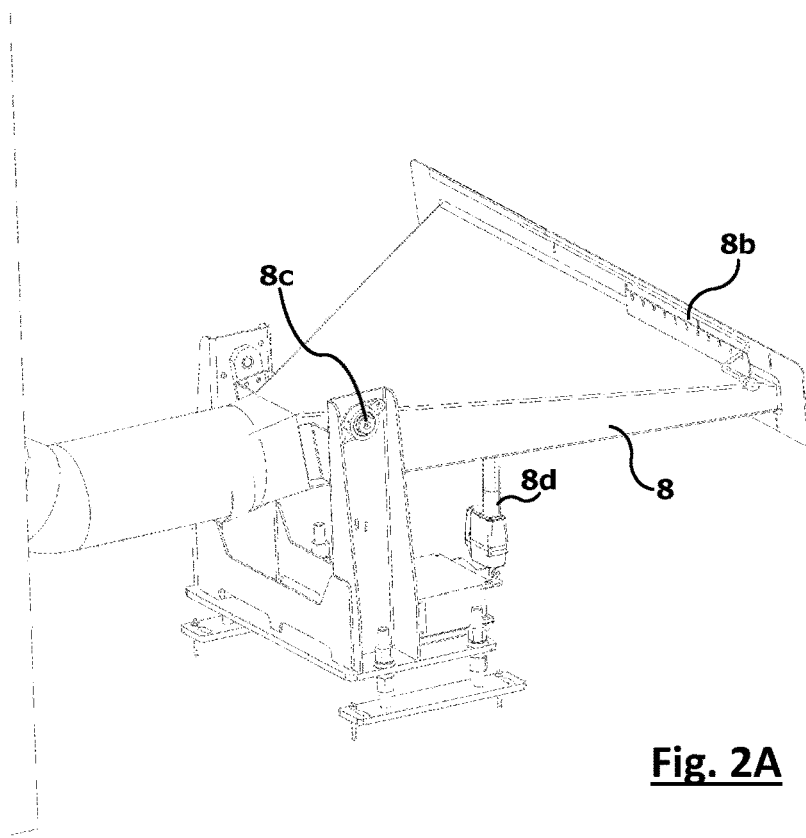
FIGS. 2A and 2B are perspective views, respectively front and rear, of a preferred embodiment of the convergent member of the suction machine.
Figure 2B:
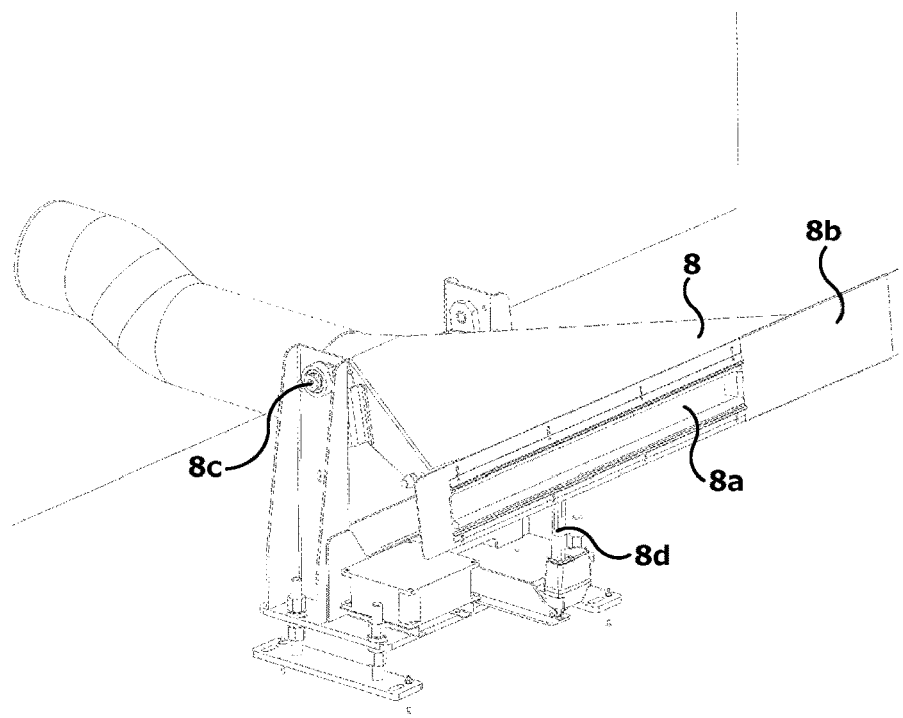
Figure 3:
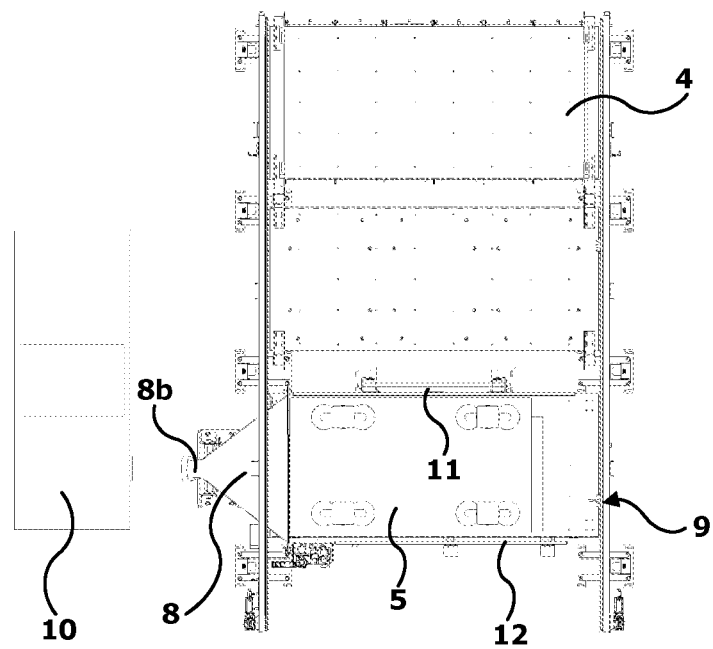
FIG. 3 is a top plan view partially cut away, of the apparatus of FIG. 1.

According to a further preferred variant (see FIGS. 2A and 2B), the width of the suction mouthpiece 8a is provided with throttle means 8b, which reduce the width thereof to the desired extent. These throttle means 8b, which can be hand-operated for example, are useful for reducing the width extension of the mouthpiece 8a in order to adapt it to the side extension of the sheets and to increase the efficiency of operation when working with narrower metal sheets than the wider ones provided by design (for example 1250 mm compared to 1500 mm).

Moreover, advantageously, on the opposite side with respect to the convergent duct 8, a blowing assembly 9 is provided (see better in FIG. 5), adapted to blow compressed air towards the stack of metal sheets.

The blowing assembly 9 comprises a plurality of nozzles from which compressed air is ejected (for example at 5-6 bar, with a variable flow rate depending on the distance between the air blow and the sheet), sufficient to ensure a uniform air flow directed towards the suction duct 8 and which runs adjacent to the upper plane of the stack of sheets.

Preferably, for reasons of greater simplification of the structure and better functionality, it is preferred that these nozzles are not distributed over the width of the tunnel chamber but are grouped on a support bracket arranged approximately centrally on the sheet side on the opposite side of the mouthpiece 8a compared to the stack of sheets. The nozzles may however be arranged adjustable in their orientation, in particular adjustable both in height and transversely. Possibly, the support bracket for the nozzles can be mounted movably relative to the plane 5 supporting the stack of sheets, for example by mounting the translatable bracket along the frame 2 or by exploiting the mobility of the support plane 5.

According to a preferred feature of the present invention, parallel boundary plates 11, 12 are also provided, adjacent to on two parallel sides of the pack of sheets—the longer sides in the example illustrated—having a function of lateral delimitation of the air flow running towards the suction convergent duct 8. The boundary plates 11, 12 are therefore arranged parallel to each other and adjacent to the two sides other than the side adjacent to the mouthpiece 8a of the suction duct 8.

Preferably, the boundary plates 11 and 12 can be collapsed, that is, they are kept upright next to the sheets, constituting vertical delimiting walls (as illustrated in the figures), during operation of the foil removing apparatus, while they can be collapsed in an inoperative condition, for example by making them rotate around a horizontal axis to lie them down on a horizontal plane or by making them go down vertically below the level of the plane 5.

In principle, these boundary plates 11 and 12 can be continuous and have the same length as the support plane 5 of the metal sheets. However, since their purpose is to define and delimit a suction chamber above the last sheet of the stack, it is also desired to avoid creating an excessive depression (with drawbacks which are illustrated later on): for this purpose it is preferred that the boundary plates 11 and 12 are provided with an array of through holes (as clearly shown in FIG. 5) which make them partially permeable to air.

Finally, according to an additional feature of the present invention, it is conceived to install within the suction machine 10 a plurality of shredding knives or blades (not shown), which allow to shred the material which is sucked through the convergent duct 8 and then easily convey the shredded material towards a waste area, always with pressurized air, at distances of more than 10 meters with respect to the suction position.

The above described configuration allows to create a very effective suction area at the top of the stack of sheets, which creates a lifting effect of the separating paper foils and subsequent dragging towards the suction machine 10. The described structure, together with a singular operating method, allows then to make the suction effect particularly effective, even for large surfaces, by forming a delimited suction chamber, as will be explained below.

In operation, the gripping heads 7 are brought above the stack of sheets and made go down until they grasp (either with suction cups or with magnetic heads) an upper metal sheet $L_1$ of the stack. The heads 7 are then raised to lift the upper sheet $L_1$, freeing and releasing a separating foil, typically a paper foil (outlined in C in FIG. 4), resting on the underlying sheet or, possibly, at least in part attached below the upper sheet.

At this point, the upper sheet $L_1$, lifted for example by a few centimetres with respect to the pack of sheets, together with the lateral boundary plates 11 and 12, define a suction chamber of suitable volume (defined by the height of the upper sheet, based on the operating parameters of the suction duct 8 and of the blowing assembly 9).

In this step, the suction machine 10 and the blowing assembly 9 are operated, to produce a stream of air directed towards the suction machine 10 and a suction effect in the suction chamber, which succeeds in withdrawing and removing the paper foil C from the stack of plates, foil that ends within the convergent 8 and then is disposed downstream of the suction machine 10.

The depression created in the suction chamber is adjusted by acting on the available parameters (power of the suction machine 10, effectiveness of the blowing assembly 9, height of the upper sheet with respect to the stack, size and permeability of the lateral boundary plates 11 and 12), so as to not exceed a predetermined threshold, which would end up detaching the upper sheet $L_1$ from the gripping heads 7.

It is therefore preferable to provide control means of the height of the upper sheet $L_1$ with respect to the pack of sheets and appropriate adjustments of the other operating components.

As the stack of sheets is reduced, the slot-shaped mouthpiece 8a of the duct 8 is also lowered, to always bring it to an effective level for removing the separating foil C.

According to a preferred operating mode, the gripping heads 7 arranged at a distance along the axis of the sheets lift the metal sheet at the respective gripping points at different times or at different heights. For example, the head edge 7 closest to the blowing assembly 9 is first lifted, so as to arrange the sheet which is not in plane, but with a certain curvature converging towards the pack of sheets in the area of the suction mouthpiece 8a. At the same time, the blowing assembly 9 is activated, as soon as the adjacent sheet edge has been lifted by the relative gripping head 7, so that a localized air flow is generated which tends to better detach the paper foil from the pack of sheets, without the drawbacks resulting from a excessive depression. The suction chamber thus also takes a convergent shape, which facilitates rapid removing of the paper foil C, at the same time taking advantage of the dead times of the lifting phase of the top sheet L 1.

In summary, the overall process of picking-up the metal sheets and removing the separating foil is as follows.

In a first step, a first sheet $L_1$, or top sheet of the sheet pack, is gripped by the gripping heads 7 and lifted to a height shortly spaced from the underlying sheet, with which a tunnel chamber is formed, possibly with the upper side convergent if the two gripping heads exert a differentiated action (in time or in height). At the same time, the suction means 8 and 10 an/or the blowing means 9 are activated, generally able to generate a suction and removing air flow of a separating foil from said tunnel chamber, towards a trash.

According to the method of the invention, advantageously the air flow generating means for paper foil removal are coordinated with the lifting heads to operate only after the first sheet $L_1$ has reached a position a little spaced from the underlying sheet.

More precisely, the activation of the air flow generating means through the tunnel chamber is triggered by a consent output when the first sheet $L_1$ has reached the desired height with respect to its starting position at the top of the underlying stack of sheets. Alternatively, the flow generating means are activated before the gripping heads begin to lift the top sheet $L_1$.

Preferably, the top sheet $L_1$ is lifted up to stasis height of about 30-70 mm from the underlying sheet, preferably about 50 mm but still less than 70 mm, and held in this position for a variable stasis time between 1 and 6 sec, preferably 3 sec, during which the suction phase of the separating foil is performed.

Preferably, to facilitate detaching the paper foil C and its removing, the blowing assembly 9 is activated before the suction machine 10.

The presence of the boundary plates for defining and delimiting the suction tunnel is not strictly necessary but constitutes a preferred aspect of the apparatus according to the invention.

For a better understanding of the operation of the device according to the invention, the suction and removing cycle of the paper foil provides in detail the following phases:

a. at the start of the cycle, the gripping heads 7 are positioned above a sheet which is in the highest position of the pack of plates, called the first sheet $L_1$;

b. a laser photocell present on the work assembly reads the height h of the top sheet $L_1$, so as to provide a relative position signal;

c. the height signal h constitutes the height information of the top sheet $L_1$, which is used to correctly position the gripping heads 7 and possibly adjust the height of the mouthpiece 8a of the suction duct 8 and of the blowing assembly 9;

d. the removing system is then activated, on one hand activating the sucking assembly 10 which creates an air flow being sucked through the duct 8 (which creates a vacuum near the paper foil C) and, on the other hand, preferably also activating an air blow at the blowing assembly 9, positioned on the opposite side with respect to the duct 8;

e. at the same time the gripping devices (for example the vacuum pump for the suction cups) of the gripping heads 7 are activated, which can be lifted bringing the first plate $L_1$ therewith;

f. the top sheet $L_1$ is lifted only by a small extent, up to the stasis height, so that a substantially empty tunnel chamber is formed, of the same dimensions as the sheets;

g. in this tunnel chamber, the paper foil C is substantially free, whether it remains resting on the underlying sheet, or whether it remains partly adherent below the first sheet $L_1$; in any case, the air flow that passes through the tunnel chamber—due to the concurrent actions of suction by the convergent duct 8 and blowing of the blowing assembly 9—easily drags the paper foil C, now "free" of moving between the two sheets, which is thus easily removed from the tunnel chamber;

h. once the paper foil C has been removed, the gripping heads 7 can be activated again for the final lifting, at transport height, of the first sheet $L_1$, which can then be transferred to the cutting machining; at the same time the underlying sheet—which becomes the top sheet of the stack—is free from the paper foil C and ready to be withdrawn in a subsequent working cycle.

As can be understood from the above description, the apparatus of the invention perfectly achieves the purposes stated in the introduction. It is in fact possible to withdraw and quickly and reliably remove the separating foil between the sheets, without significant dead times and without exposing the operators to risks of injury. The optimization of components, their shape and arrangement, as well as the synergetic use of the gripping heads, temporarily produce a suction chamber/tunnel that is very effective.

It is understood, however, that the invention should not be considered limited to the particular arrangements illustrated above, which constitute only some exemplary embodiments thereof, but that different variants are possible, all within the reach of a person skilled in the art, without departing from the scope of the invention itself, as defined by the following claims.

For example, although reference has always been made in the description to metal sheets, it cannot be excluded that the proposed solution can also be employed with other types of flat sheets, such as sheets made of plastic or other materials.

The invention claimed is:

1. A sheet handling apparatus for picking up sheets from a pack of sheets and removing a separating foil (C) between said sheets, comprising:
    lifting means for lifting a top sheet ($L_1$) from said pack of sheets, equipped with upper gripping heads (7);
    air flow generating means (8, 9, 10) for generating an air flow above said pack of sheets; and
    control means configured to control said lifting means according to a stasis height and a stasis time, whereby said lifting means are controlled such that said top sheet ($L_1$) is lifted up to the stasis height, and then held at the stasis height above said pack of sheets for said stasis time to form during said stasis time a tunnel chamber delimited by said top sheet ($L_1$) and said pack of sheets, said stasis height being at most 70 mm, and said air flow generating means (8, 9, 10) being operative at least during said stasis time to generate an air flow through the tunnel chamber.

2. The apparatus of claim 1, wherein said air flow generating means comprise a suction machine equipped with a convergent duct (8) provided with a slot-shaped mouthpiece (8a) arranged close to one of smaller sides of said pack of sheets.

3. The apparatus of claim 2, wherein said air flow generating means also comprise a blowing assembly (9), arranged at a smaller side of said pack of sheets opposite to the one of said smaller sides where said slot-shaped mouthpiece (8a) is arranged.

4. The apparatus of claim 3, wherein said blowing assembly (9) comprises a plurality of blowing nozzles mounted on a support bracket with adjustable attitude.

5. The apparatus of claim 2, further comprising:
    at least one pair of collapsible boundary plates (11, 12), flanked to longer sides of said pack of sheets, arranged up to a height greater than said pack of sheets at least during said stasis time.

6. The apparatus of claim 2, wherein at least said slot-shaped mouthpiece (8a) is adjustable in height.

7. The apparatus of claim 6, wherein said air flow generating means also comprise a blowing assembly (9), arranged at a smaller side of said pack of sheets opposite to the one of said smaller sides where said slot-shaped mouthpiece (8a) is arranged.

8. The apparatus of claim 6, further comprising:
    at least one pair of collapsible boundary plates (11, 12), flanked to longer sides of said pack of sheets, arranged up to a height greater than said pack of sheets at least during said stasis time.

9. The apparatus of claim 1, further comprising:
    at least one pair of collapsible boundary plates (11, 12), flanked to longer sides of said pack of sheets, arranged up to a height greater than said pack of sheets at least during said stasis time.

10. The apparatus of claim 9, wherein said boundary plates (11, 12) have a height at least equal to said stasis height and are equipped with an array of through holes.

11. The apparatus of claim 1, wherein the control means is configured to re-activate the lifting means following the stasis time, to lift the top sheet ($L_1$) to a transport height.

12. The apparatus of claim 1, wherein the control means is configured to control the lifting means so that, in lifting the top sheet ($L_1$) from said pack of sheets, a head edge of the top sheet ($L_1$) closest to a blowing assembly (9) of said air flow generating means is lifted so that the top sheet ($L_1$) is curved when forming the tunnel chamber with said pack of sheets.

13. A sheet handling apparatus for picking up sheets from a pack of sheets and removing a separating foil (C) between said sheets, comprising:
    lifting means for a top sheet ($L_1$) equipped with upper gripping heads (7);
    air flow generating means (8, 9, 10) for generating an air flow above said pack of sheets, comprising at least one convergent duct (8) of a suction machine (10) having a slot-shaped mouthpiece (8a) arranged close to a first side of said pack of sheets; and
    at least one pair of boundary plates (11, 12), flanked to second sides of said pack of sheets and extending at a height greater than said pack of sheets.

14. The apparatus of claim 13, further comprising:
    control means configured to control said lifting means according to a stasis height and a stasis time, whereby said lifting means are controlled such that said top sheet ($L_1$) is held at the stasis height above said pack of sheets during said stasis time, said stasis height being at most 70 mm, and said air flow generating means (8, 9, 10) being operative at least during said stasis time.

15. The apparatus of claim 13, wherein said pair of boundary plates is mounted movably in a vertical direction.

16. A method for picking up sheets from a pack of sheets and removing a separating foil (C) between said sheets, the method comprising:
    gripping and lifting, by gripping heads (7), a top sheet ($L_1$) of said pack of sheets up to a stasis height above said pack of sheets, said stasis height being at most 70 mm;
    holding said top sheet ($L_1$) by the gripping heads (7) at the stasis height for a stasis time so as to define a suction chamber between said top sheet ($L_1$) and said pack of sheets during said stasis time; and
    during said stasis time, generating an air flow in the suction chamber between said pack of sheets and said top sheet ($L_1$) by air flow generating means (8, 9, 10) arranged close to said pack of sheets, thereby dragging said separating foil (C) towards a first side of said pack of sheets.

17. The method of claim 16, wherein said gripping heads (7) are at least two, arranged spaced along a second side of said pack of sheets and provide for lifting said top sheet ($L_1$) differently in time or height.

18. The method of claim 17, wherein a pair of boundary plates (11, 12) is arranged, flanked to second sides of said pack of sheets and extending at a height greater than said pack of sheets, at least during said stasis time.

19. The method of claim 16, wherein a pair of boundary plates (11, 12) is arranged, flanked to second sides of said pack of sheets and extending at a height greater than said pack of sheets, at least during said stasis time.

20. The method of claim 16, wherein, after said stasis time, the gripping heads (7) are activated again for another lifting of the top sheet ($L_1$) to a transport height.

* * * * *